United States Patent
Yan et al.

(10) Patent No.: US 9,304,657 B2
(45) Date of Patent: Apr. 5, 2016

(54) AUDIO TAGGING

(71) Applicants: David Yan, Portola Valley, CA (US); Konstantin Anisimovich, Moscow (RU)

(72) Inventors: David Yan, Portola Valley, CA (US); Konstantin Anisimovich, Moscow (RU)

(73) Assignee: ABBYY Development LLC (RU)

( * ) Notice: Subject to any disclaimer, the term of this patent is extended or adjusted under 35 U.S.C. 154(b) by 0 days.

(21) Appl. No.: 14/311,851

(22) Filed: Jun. 23, 2014

(65) Prior Publication Data

US 2015/0187353 A1 Jul. 2, 2015

Related U.S. Application Data

(60) Provisional application No. 61/922,597, filed on Dec. 31, 2013.

(51) Int. Cl.

| | |
|---|---|
| *G10L 15/00* | (2013.01) |
| *G06F 3/0481* | (2013.01) |
| *G06F 17/21* | (2006.01) |
| *G06F 17/22* | (2006.01) |
| *G06F 17/30* | (2006.01) |
| *G06F 3/0484* | (2013.01) |
| *G10L 15/18* | (2013.01) |
| *G06Q 10/10* | (2012.01) |

(52) U.S. Cl.
CPC ........ *G06F 3/04817* (2013.01); *G06F 3/04842* (2013.01); *G06F 17/211* (2013.01); *G06F 17/22* (2013.01); *G06F 17/301* (2013.01); *G06F 17/30017* (2013.01); *G06F 17/3053* (2013.01); *G06F 17/30112* (2013.01); *G06F 17/30115* (2013.01); *G06F 17/30126* (2013.01); *G06F 17/30253* (2013.01); *G06F 17/30327* (2013.01); *G06F 17/30554* (2013.01); *G06F 17/30598* (2013.01); *G06F 17/30867* (2013.01); *G06F 17/30997* (2013.01); *G10L 15/1815* (2013.01); *G06Q 10/107* (2013.01)

(58) Field of Classification Search
CPC .................... G06F 17/30047; G06F 17/30796; G06F 17/2785; G06F 17/30026; G06F 17/30044; G06F 17/30056; G06F 17/30749; G06F 17/30784; G06F 17/3082; G06F 11/328; G06F 17/30265; G06F 17/3002; G06F 17/30247; G06F 17/30017; G06F 17/218; G06F 17/241; G06F 17/30038; G06F 17/30268; G10L 15/26; G10L 15/00; G10L 15/22; G10L 15/30; G10L 15/142; G10L 15/24; G10L 15/265; G10L 19/0018; G10L 2015/228; G10L 2015/0631; G10L 25/48; G10L 25/54
USPC ............... 704/1–10, 251, 255, 257, 235, 270, 704/270.1
See application file for complete search history.

(56) References Cited

U.S. PATENT DOCUMENTS

| | | | |
|---|---|---|---|
| 2007/0156843 A1* | 7/2007 | Sagen et al. .................. | 709/217 |
| 2009/0103901 A1* | 4/2009 | Endo et al. .................... | 386/124 |
| 2011/0258188 A1* | 10/2011 | AbdAlmageed et al. ..... | 707/736 |
| 2013/0325462 A1* | 12/2013 | Somekh et al. ............... | 704/235 |

* cited by examiner

*Primary Examiner* — Huyen Vo
(74) *Attorney, Agent, or Firm* — LeighAnn Weiland; Veronica Weinstein

(57) ABSTRACT

Various embodiments are provided for enabling audio tagging of image files. The audio messages are obtained by the system, usually by recording an audio message from a user, and then converted into a textual tag, using speech recognition technology. In some implementations semantic analysis of text component of these massages is performed. In some implementations the textual tags are then propagated to other image files associated with the user.

27 Claims, 3 Drawing Sheets

AUDIO TAGGING

CROSS-REFERENCE TO RELATED APPLICATION

This non-provisional application claims priority to U.S. Provisional Application 61/922,597 filed on Dec. 31, 2013, the entire contents of which are incorporated herein by reference and is relied upon for claiming the benefit of priority.

FIELD OF THE INVENTION

The present invention relates in general to computers, and more specifically, to a system which allows users to tag, access, distribute, synchronize, manage and search different type of content, including but not limited to audio and video files across multiple devices and cloud servers.

DESCRIPTION OF THE RELATED ART

Many people today use multiple devices and media in their daily activities. Often these devices contain a great number of image files, such as digital photographs and videos. When such image files are created, i.e. when photographs are taken or videos recorded, recording devices usually create metadata associated with the image files. However, this metadata does not usually provide meaningful information regarding content of the image file. Typically, in order for a user to be able to easily manage these image files, the user must first perform tedious manual tagging operations, such as tagging names of his relatives and friends on faces and objects (e.g., sea, beach, house, tree, etc.) so that those faces and objects will be recognized and associated with the remainder of the user's photos and tagged in the future. In most cases, the user does not have time to perform this manual tagging.

As a result, it becomes impossible for the user to perform a meaningful search of these files. Moreover, the user may have multiple copies of such image files located on the same device, or on his other devices, or in cloud storage. Managing these image files without meaningful tags becomes a challenge. Hence, there is a need for a system allowing the user to easily create meaningful tags associated with the image files. Moreover, it is sometimes preferred for such tags to be uniform across the user's devices, to be able to facilitate easy and reliable searching, and to assist in eliminating image duplicates.

SUMMARY

In general, one aspect of the subject matter described in this specification can be embodied in methods that include the actions of receiving an audio message associated with an image file, processing the audio message using voice recognition technology to detect a text component of the audio message, determining a textual tag for the image file based on the detected text component, and associating the textual tag with the image file. Other implementations of this aspect include corresponding systems, apparatus, and computer programs.

These and other aspects can optionally include one or more of the following features. The determining of the textual tag can include semantic analysis of the text component, which sometimes includes identifying one or more semantic classes for one or more portions of the detected text component; performing semantic clustering of the portions of the detected text components. In this case, the determining of one or more textual tags for the one or more image files is at least partially based on the semantic clustering of the portions of the detected text.

The image file can be one of a plurality of image files associated with a user, and the methods can further include associating the textual tag with a second image file from the plurality of image files associated with the user based on analysis of properties of the image file and the second image file. The properties of the image file and the second image file be selected from a set consisting of file name, file metadata, file location, file creation date, file size, and file image analysis results. The obtaining of the audio message associated with one or more image files can further include detecting that a first image file is being displayed on a device associated with a user; determining a first period of time when the first image file is displayed on the device associated with the user; and time stamping the obtained audio message. The determining of the one or more textual tags for the one or more image files based on the detected text component can further include determining a first portion of the detected text component corresponding to the first period of time using the time stamps of the obtained audio message; and identifying a first set of the one or more textual tags that were determined based on the first portion of the detected text component. The assigning the one or more textual tags to the one or more image files can further include assigning one or more of the textual tags from the first set of the one or more textual tags to the first image file.

These and other aspects can additionally include one or more of the following features. The determining of textual tag can further comprise selecting the textual tag from a tag library. The associating the textual tag with the image file can further comprise associating the textual tag with a portion of the image file.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

In order that the advantages of the invention will be readily understood, a more particular description of the invention briefly described above will be rendered by reference to specific examples that are illustrated in the appended drawings. Understanding that these drawings depict examples of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
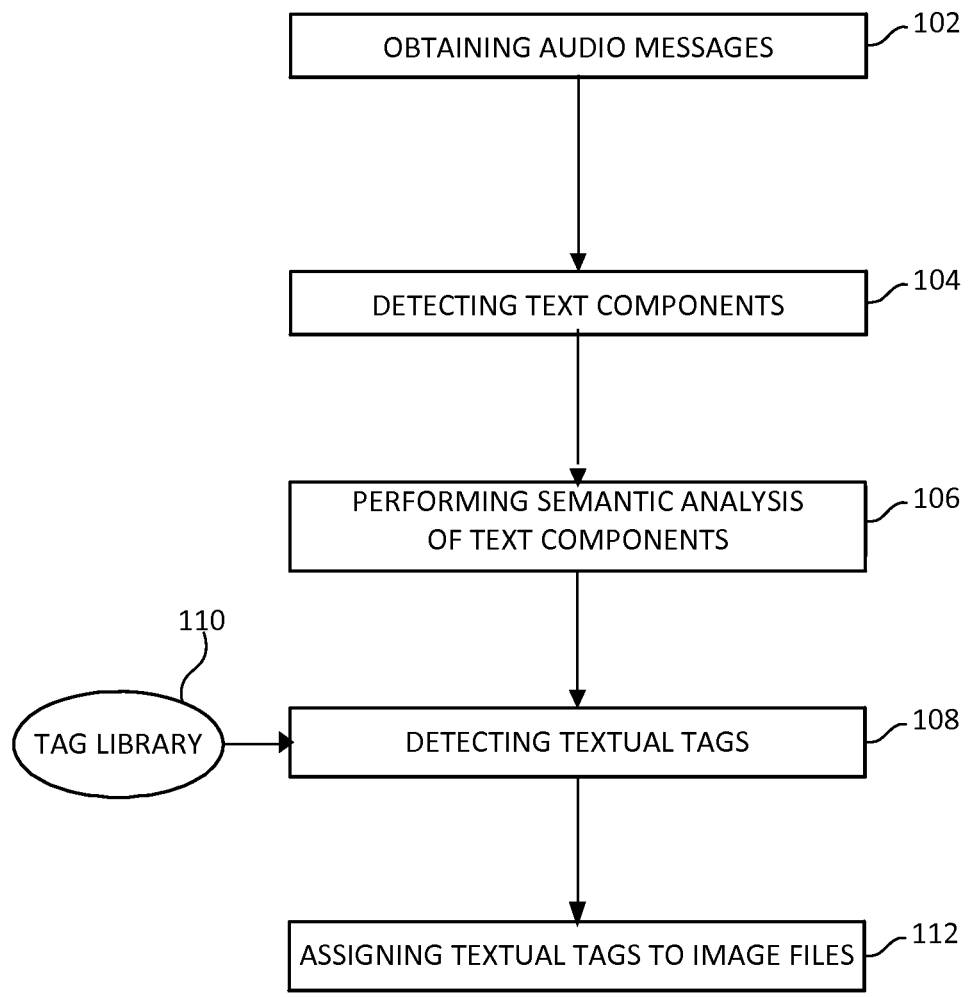
FIG. 1 is an example process for creating text tags based on audio message associated with an image file.

FIG. 1 illustrates an example process for assigning tags to the image files. The image files are files containing digital images, such as digital photographs, digital videos, or digital pictures. The image files are composed of digital data in one of image file formats, such as JPEG, JFIF, TIFF, RAW, GIF, BMP, PNG, etc. In some examples the image files contain data in compressed format. In other examples these files are uncompressed.

In step 102 an audio message is obtained. In some implementations, the audio message is obtained by recording a user's voice. For example, the user verbally describes the photos on the screen. This may occur, for example, by the person dictating to his device various details about a particular photo. An audio message being recorded usually contains information regarding an image included in the image file, such as a geographical location where the image was captured (e.g., my home, hotel where we stayed, the beach), an activity presented in the image (e.g., son's soccer game, wife's birthday party, etc.), names of people seen in the image, the time when the image was captured, or other related information.

In some implementations, the user is presented with an option of recording an audio message and associating the audio message with an image file. In other implementations, the image file is displayed to the user, and then the user is given an opportunity to record the message and associate it with the image file. In some implementations, the image file is displayed to the user while the message is being recorded. In another implementation, the user records the message and then chooses an image file to be associated with the message. In other implementations, the user associates a preexisting audio message with one or more image files.

In some implementations the audio message is obtained by automatically recording the user's voice or another person's voice. Users generally like to share photos not only through social networking channels, but also by using devices themselves (e.g., a user shows his smartphone to a friend to show a series of pictures from a recent trip). During such demonstrations, the user typically discusses these photos. In addition, the viewer himself may ask questions about the photo being viewed to the user demonstrating the photo, in which the user responds with additional information about the photo. All of these verbal discussions may be recorded by one of the user's devices to form the audio message associated with the image being displayed at the time of this conversation.

In some implementations, the system detects when the image file is being displayed on the user's device. After the viewing of the image file is detected, in some implementations the user is presented with an opportunity to start recording his conversation to perform audio tagging. In other implementations the recording of the user's conversation is started automatically when the system detects that the image file is being displayed.

In some implementations the system determines a period of time during which a particular image file is displayed, usually, by detecting times when the displaying of the image started and when it is ended. As a result, periods of time when the particular image is being displayed are determined. These periods of time can be consecutive or separated.

Also, in some implementations, the recorded audio message is being time stamped. In some implementations the audio message is time stamped at particular time intervals. In other implementations the audio message is time stamped when the image file displayed by the device changes, i.e. the user switches to another image or stops displaying the images.

In some implementations the system correlates one or more of the periods of time when the image is displayed with corresponding portions of the audio recording.

In an implementation, when the image file is a video file, while the audio message is being recorded, a portion of the video being displayed at the time of the recording gets to be associated with a corresponding portion of the audio message. In other words, the message and the video being displayed during recording of the message are being synchronized.

In another implementation, the image files having audio messages associated with them are located on one of the user's devices, such as his telephone, laptop, desktop, tablet, photo or video camera, etc. In still another implementation, the image files are located on remote storage devices. In another implementation, the audio message is located at the same location or same device as the image data. In another implementation, the audio message is located in a different location from the corresponding image file or files.

In some implementations, more than one audio message is associated with the image file.

In step 104, the audio message is processed using one of known speech recognition technologies (or speech-to-text technologies) to detect a text component of the audio message. A text component of a tag is a portion of the tag consisting of words in a natural language. According to some implementations, the detected text component is associated with the image file or files connected to the audio message being processed. In an implementations when the time period during which a particular image file is displayed by the user device is correlated with a corresponding portion of the audio message, the system identifies a portion of the text component corresponding to the portion of the audio message, and, sometimes, this portion of the text component is then associated with the image file that was displayed while this portion of the audio message was being recorded.

In an example, when the image file is a video file, portions of the text content are matched to the portions of the video file corresponding to the portions of audio message where the text component originated. In some examples, the text component is further processed before being associated with the image file.

In step 106, the detected text component is analyzed using semantic analysis to recognize the meaning of the text component. In some implementations, text analysis software systems are used to perform this semantic analysis.

In some implementations the semantic analysis of the text component includes determining semantic structure of at least some portions of the text component and determining one or more semantic classes with which the corresponding portion of the text component can be identified with high probability.

In step 108, the text component is processed to determine one or more textual tags to be associated with the one or more image files associated with the audio message. In some implementations, results of semantic analysis 106 of the text component are used in determining the textual tags. In another implementation, the semantic analysis step 106 is omitted.

In some implementations, the determining of textual tags 108 consists of processing the text component to decide which words from the text component should be used as textual tags. In some implementations, the decision is based on syntactic analysis of the text component, or on the frequency analysis of words in the text component, or on comparing the words on the text component with an existing tag library 110, or a combination thereof.

In some implementations, the tag library 110 is a collection of tags previously used by the user when tagging his image files. In other implementations, the tag library is a collection of tags used on one or more of the user's devices and services. In still other implementations, the tag library is a preexisting collection of tags obtained from an outside source.

In instances where the text component was processed using semantic analysis 106, the determining of textual tags 108 includes considering the results of the semantic analysis 106. In some implementations the semantic analysis of the text component includes identifying one or more semantic classes for one portion or some portions of the detected text component. Subsequently, in some implementations, the system performs semantic clustering of these portions. The results of the clustering can be used in determining at least some of the textual tags for the image files. Also, the results of the semantic analysis 106 of the text component include language-independent presentation of the text component. Therefore, when semantic analysis is applied, texts describing, for example, the same event or location using different vocabulary can still be matched together.

In some implementations, when a portion of the text component has been found to correspond to a particular file image, the system identifies a set of textual tags corresponding to this portion of the text component and also associates it with this particular image file.

According to some implementations, after the textual tags are determined at step 108, one or more of these new tags are assigned to the one or more of the image files 112. The assigning of the one or more new textual tags is performed automatically, for example. In another example, the new tags are first presented to the user, and the user is given an opportunity to accept or reject these new tags. In some implementations, where there is a set of textual tags associated with a particular image file, one or more tags from this set are associated with this image file.

Figure 2:
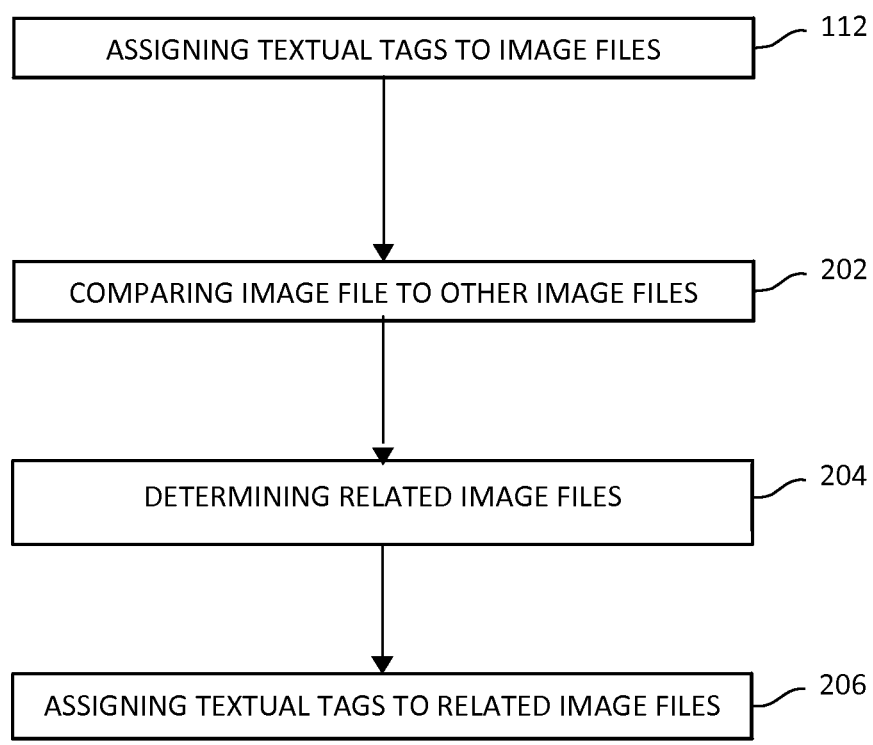
FIG. 2 is an example process for propagating the created text tags to other image files associated with the same user.

As illustrated on FIG. 2, in some implementations, after one or more of the image files is assigned the new textual tag 112 based on the audio message, the system attempts to propagate this new tag to other images on the user's devices or to other file storage locations.

In step 202, the other image files on the user's devices and other storage locations are compared to the newly tagged image file to identify related image files. In some examples, the file parameters being compared are one or more of the following: file name, file location, file metadata, file creation date, file size, geographical location of a place where the image was captured, file image analysis results, or any combination thereof.

In some implementations the step 202 includes performing file image analysis, sometimes including face recognition analysis, of the newly tagged image file and the other image files. In some implementations the image analysis and/or face recognition analysis of the other image files is performed in advance, and the results of such analysis are used for comparison.

According to some implementations, one or more of these file parameters for the newly tagged image file and the other file are compared, and a distance between values of these parameters for the newly tagged image file and for the other image file is determined.

In step 204, the system determines which of the other files are related to the newly tagged image file to add the new tag to the related image files. In order to make this determination, one or more of the compared parameters are used. In some implementations, these parameters are combined based on the distances between the values of the parameters for the compared files. In some implementations, each parameter is weighed based on this distance. In still another implementation, the weight is either 0 or 1 where 1 is assigned when the parameters for the newly tagged file and the other file match, and 0 is assigned when they do not match. The weights are scaled and are determined based on the distance between values of these parameters, in some examples.

After the system determines which of the other image file are related to the newly tagged image file 204 and should have the new textual tag assigned to them, such assigning of the new textual tag 206 is performed automatically, in some implementations. In other implementations the user is first presented with the determined image file and the new textual tag and is given an opportunity to either confirm the new tag for this other image file or reject it.

Figure 3:
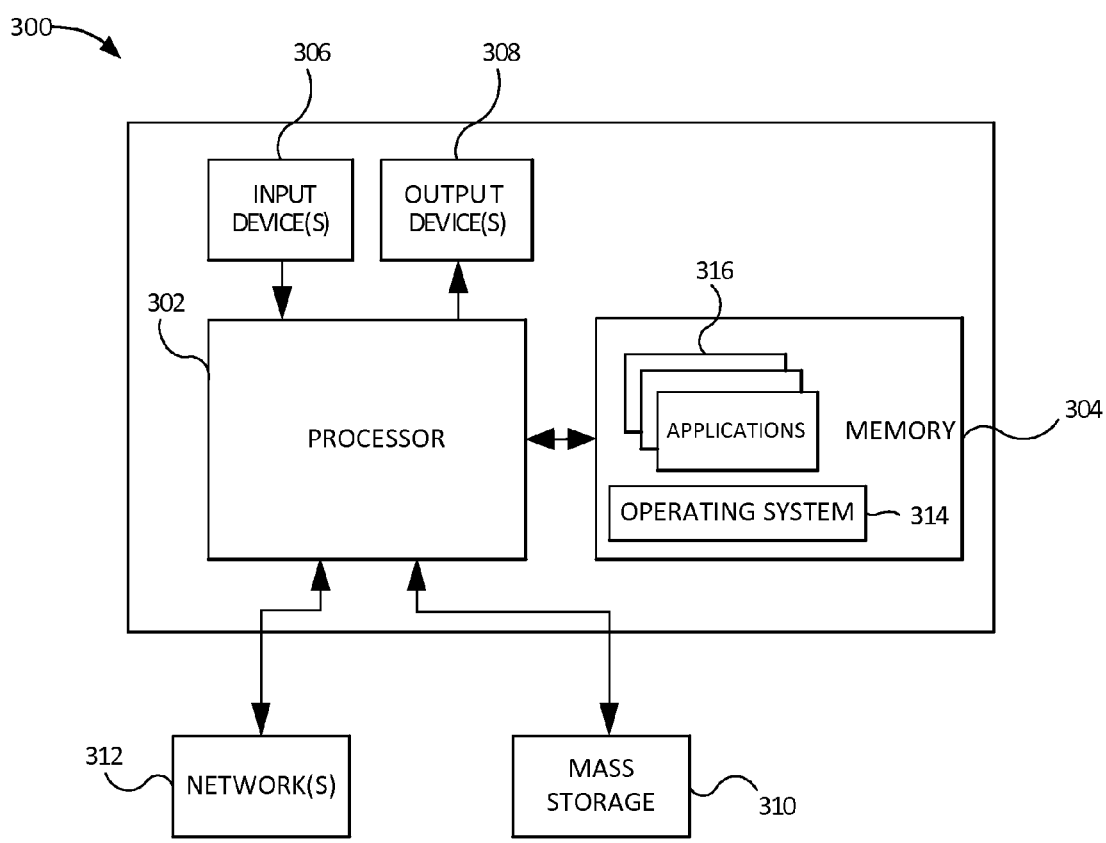
FIG. 3 illustrates an exemplary computer system that in some implementations is used with the present invention

FIG. 3 illustrates an exemplary computer system 300 that in some implementations is used with the present invention, as described above. The system 300 includes one or more processors 302 connected to a memory 304. The processor(s) 302 may contain one or more computer cores or may be a chip or other device capable of performing computations (for example, a Laplace operator may be produced optically). The memory 304 may be random access memory (RAM) and may also contain any other types or kinds of memory, particularly non-volatile memory devices (such as flash drives) or permanent storage devices such as hard drives, etc. In addition, an arrangement can be considered in which the memory 304 includes remotely located information-storage media, as well as local memory such as cache memory in the processor(s) 302, used as virtual memory and stored on an external or internal permanent memory device 310.

The computer system 300 also usually includes input and output ports to transfer information out and receive information. For interaction with a user, the computer system 300 may contain one or more input devices 306 (such as a keyboard, a mouse, a scanner, or other) and output devices 308 (such as displays or special indicators). The computer system 300 may also have one or more permanent storage devices 310 such as an optical disk drive (CD, DVD, or other), a hard disk, or a tape drive. In addition, the computer system 300 may have an interface with one or more networks 312 that provide connection with other networks and computer equipment. In particular, this may be a local area network (LAN) or a Wi-Fi network, and may or may not be connected to the World Wide Web (Internet). It is understood that the computer system 300 may include analog and/or digital interfaces between the processor 302 and each of the components 304, 306, 308, 310 and 312.

The computer system 300 is managed by an operating system 314 and includes various applications, components, programs, objects, modules and other, designated by the consolidated number 316.

The programs used to accomplish the methods corresponding to this invention may be a part of an operating system or may be a specialized peripheral, component, program, dynamic library, module, script, or a combination thereof.

This description shows the basic inventive concept of the inventors, which cannot be limited by the hardware mentioned earlier. It should be noted that hardware is primarily intended to solve a narrow problem. As time goes by and as technology develops, such a task becomes more complex or it evolves. New tools arise that are capable of meeting new demands. In this sense, it is appropriate to look at this hardware from the point of view of the class of technical tasks they solve, not simply as a technical implementation on some elementary framework.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

What is claimed is:

1. A method implemented by a data processing apparatus, the method comprising:
    obtaining, at one or more processors, an audio message associated with one or more image files, wherein the obtaining comprises:
        detecting that a first image file is being displayed on a device associated with a user,
        determining a first period of time when the first image file is displayed on the device associated with the user, and
        time stamping the obtained audio message;
    processing, at the one or more processors, the audio message using speech recognition technology to detect a text component of the audio message;
    determining, at the one or more processors, one or more textual tags for the one or more image files based on the detected text component, wherein the determining comprises determining a first portion of the detected text component corresponding to the first period of time using the time stamps of the obtained audio message and identifying a first set of the one or more textual tags that were determined based on the first portion of the detected text component; and
    assigning, at the one or more processors, the one or more textual tags to the one or more image files, wherein the assigning comprises assigning one or more of the textual tags from the first set of the one or more textual tags to the first image file.

2. The method of claim 1, wherein the determining of the one or more textual tags comprises performing semantic analysis of the text component.

3. The method of claim 2, wherein the semantic analysis of the text component comprises identifying one or more semantic classes for one or more portions of the detected text component;

performing semantic clustering of the portions of the detected text components; and wherein the determining one or more textual tags for the one or more image files is at least partially based on the semantic clustering of the portions of the detected text.

4. The method of claim 1, wherein the one or more image files are from a plurality of image files associated with a user, the method further comprising:

assigning the one or more textual tags to a second image file from the plurality of image files associated with the user based on a comparison of one or more properties of the one or more image files and the second image file.

5. The method of claim 4, wherein the one or more properties of the one or more image files and the second image file are selected from the following group: file name, file location, file metadata, file creation date, file size, geographical location of a place where the image was captured, and file image analysis results.

6. The method of claim 1, wherein the one or more image files are digital photographs.

7. The method of claim 1, wherein the one or more image files are digital video files.

8. The method of claim 1, wherein the determining the one or more textual tags comprises selecting the one or more textual tags from a tag library.

9. The method of claim 1, wherein the assigning the one or more textual tags to the one or more image files comprises assigning the one or more textual tags to a portion of an image or group of images in the one or more image files.

10. A system comprising:
a machine-readable storage device having instructions stored thereon; and
a data processing apparatus in communication with the machine-readable storage device and operable to execute the instructions to perform operations comprising:
obtaining an audio message associated with one or more image files, wherein the obtaining comprises detecting that a first image file is being displayed on a device associated with a user, determining a first period of time when the first image file is displayed on the device associated with the user, and time stamping the obtained audio message;
processing the audio message using speech recognition technology to detect a text component of the audio message;
determining one or more textual tags for the one or more image files based on the detected text component, wherein the determining comprises determining a first portion of the detected text component corresponding to the first period of time using the time stamps of the obtained audio message and identifying a first set of the one or more textual tags that were determined based on the first portion of the detected text component; and
assigning the one or more textual tags to the one or more image files, wherein the assigning comprises assigning one or more of the textual tags from the first set of the one or more textual tags to the first image file.

11. The system of claim 10, wherein the determining of the one or more textual tags comprises performing semantic analysis of the text component.

12. The system of claim 11, wherein the semantic analysis of the text component comprises identifying one or more semantic classes for one or more portions of the detected text component;

performing semantic clustering of the portions of the detected text components; and wherein the determining one or more textual tags for the one or more image files is at least partially based on the semantic clustering of the portions of the detected text.

13. The system of claim 10, wherein the one or more image files are from a plurality of image files associated with a user, the method further comprising:

assigning the one or more textual tags to a second image file from the plurality of image files associated with the user based on a comparison of one or more properties of the one or more image files and the second image file.

14. The system of claim 13, wherein the one or more properties of the one or more image files and the second image file are selected from the following group: file name, file location, file metadata, file creation date, file size, geographical location of a place where the image was captured, and file image analysis results.

15. The system of claim 10, wherein the one or more image files are digital photographs.

16. The system of claim 10, wherein the one or more image files are digital video files.

17. The system of claim 10, wherein the determining the one or more textual tags comprises selecting the one or more textual tags from a tag library.

18. The system of claim 10, wherein the assigning the one or more textual tags to the one or more image files comprises assigning the one or more textual tags to a portion of an image or group of images in the one or more image files.

19. A storage device having instructions stored thereon that, when executed by a data processing apparatus, cause the data processing apparatus to perform operations comprising:
obtaining an audio message associated with one or more image files, wherein the obtaining comprises detecting that a first image file is being displayed on a device associated with a user, determining a first period of time when the first image file is displayed on the device associated with the user, and time stamping the obtained audio message;
processing the audio message using speech recognition technology to detect a text component of the audio message;
determining one or more textual tags for the one or more image files based on the detected text component, wherein the determining comprises determining a first portion of the detected text component corresponding to the first period of time using the time stamps of the obtained audio message and identifying a first set of the one or more textual tags that were determined based on the first portion of the detected text component; and
assigning the one or more textual tags to the one or more image files, wherein the assigning comprises assigning one or more of the textual tags from the first set of the one or more textual tags to the first image file.

20. The storage device of claim 19, wherein the determining of the one or more textual tags comprises performing semantic analysis of the text component.

21. The storage device of claim 20, wherein the semantic analysis of the text component comprises identifying one or more semantic classes for one or more portions of the detected text component;

performing semantic clustering of the portions of the detected text components; and wherein the determining one or more textual tags for the one or more image files is at least partially based on the semantic clustering of the portions of the detected text.

22. The storage device of claim 19, wherein the one or more image files are from a plurality of image files associated with a user, the method further comprising:
    assigning the one or more textual tags to a second image file from the plurality of image files associated with the user based on a comparison of one or more properties of the one or more image files and the second image file.

23. The storage device of claim 22, wherein the one or more properties of the one or more image files and the second image file are selected from the following group: file name, file location, file metadata, file creation date, file size, geographical location of a place where the image was captured, and file image analysis results.

24. The storage device of claim 19, wherein the one or more image files are digital photographs.

25. The storage device of claim 19, wherein the one or more image files are digital video files.

26. The storage device of claim 19, wherein the determining the one or more textual tags comprises selecting the one or more textual tags from a tag library.

27. The storage device of claim 19, wherein the assigning the one or more textual tags to the one or more image files comprises assigning the one or more textual tags to a portion of an image or group of images in the one or more image files.

\* \* \* \* \*